(12) United States Patent
Zhou et al.

(10) Patent No.: US 12,477,393 B2
(45) Date of Patent: Nov. 18, 2025

(54) ARTIFICIAL INTELLIGENCE FLOW CONTROL IN 5G CELLULAR NETWORKS AND BEYOND

(71) Applicant: AT&T Intellectual Property I, L.P., Atlanta, GA (US)

(72) Inventors: Jianchun Zhou, Bellevue, WA (US); Yakun Gao, Suwanee, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 910 days.

(21) Appl. No.: 17/703,430

(22) Filed: Mar. 24, 2022

(65) Prior Publication Data

US 2023/0308946 A1 Sep. 28, 2023

(51) Int. Cl.
| | |
|---|---|
| *H04W 28/06* | (2009.01) |
| *H04L 49/9057* | (2022.01) |
| *H04L 69/22* | (2022.01) |
| *H04W 28/08* | (2023.01) |

(52) U.S. Cl.
CPC ....... *H04W 28/065* (2013.01); *H04L 49/9057* (2013.01); *H04L 69/22* (2013.01)

(58) Field of Classification Search
CPC ............... H04W 28/065; H04W 28/08; H04W 28/0933; H04L 49/9057; H04L 49/3072; H04L 69/22

See application file for complete search history.

(56) References Cited

U.S. PATENT DOCUMENTS

| | | | |
|---|---|---|---|
| 10,772,008 B2 * | 9/2020 | Park | H04W 24/10 |
| 11,057,792 B2 | 7/2021 | Dudda et al. | |
| 11,838,151 B1 * | 12/2023 | Jones | H04L 25/0224 |

(Continued)

OTHER PUBLICATIONS

"Carrier aggregation," Wikipedia, printed Mar. 24, 2022, 3 pages.

(Continued)

*Primary Examiner* — Kent Krueger
(74) *Attorney, Agent, or Firm* — Guntin & Gust, PLC; Miyoung Shin

(57) ABSTRACT

Aspects of the subject disclosure may include, for example, receiving a data packet for transmission over a wireless network to a user equipment (UE) device in data communication with one or more network elements over one or more carrier legs of the wireless network, receiving information about current network conditions, retrieving a set of packet splitting rules which define initial boundary conditions for a process of splitting packets into smaller data packets for transmission to the UE device, applying, in a machine learning model, one or more packet splitting rules of the set of packet splitting rules to split the data packet into a set of smaller data packets, based on the information about current network conditions in the wireless network, selecting, in the machine learning model, a flow control arrangement for the data packet, including determining a number of smaller packets to split the data packet, and selecting respective carrier legs of the one or more carrier legs of the wireless network for communication of respective data packets of the number of smaller data packets, and communicating the number of smaller data packets to the UE device. Other embodiments are disclosed.

20 Claims, 10 Drawing Sheets

(56) References Cited

U.S. PATENT DOCUMENTS

2019/0037443 A1\* 1/2019 Lee .................. H04L 47/34
2022/0345938 A1\* 10/2022 Gupta ................ H04W 76/15

OTHER PUBLICATIONS

Pupiales, Carlos et al., "Capacity and Congestion Aware Flow Control Mechanism for Efficient Traffic Aggregation in Multi-Radio Dual Connectivity", Digital Object Identifier, vol. 9, 2021, Aug. 16, 2021,.
Salian, Isha , "SuperVize Me: What's the Difference Between Supervised, Unsupervised, Semi- Supervised and Reinforcement Learning", Difference Between Supervised, Unsupervised, & Reinforcement Learning | NVIDIA Blog, https://blogs.nvidia.com/blog/2018/08/02/supervised-unsupervised- learning, Aug. 2, 2018, 15 pages.
Brown, Gabriel, "AI/ML for the 5G RAN and Radio Interface", Heavy Reading White Paper produced for Qualcomm Technologies, Dec. 2021, 10 pages.

\* cited by examiner

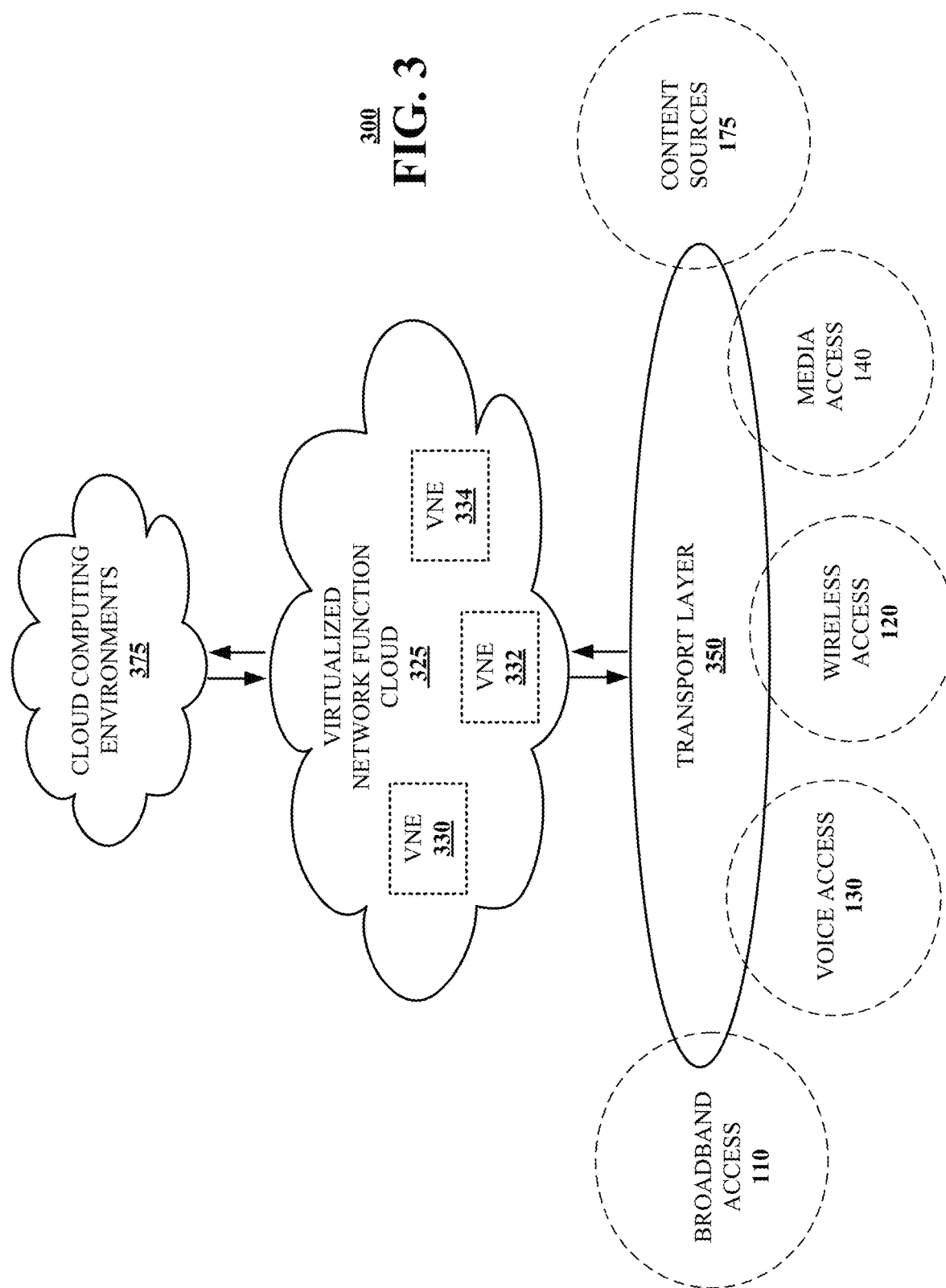

ARTIFICIAL INTELLIGENCE FLOW CONTROL IN 5G CELLULAR NETWORKS AND BEYOND

FIELD OF THE DISCLOSURE

The subject disclosure relates to a flow control in fifth generation (5G) cellular networks and future communication networks.

BACKGROUND

In mobile communication networks, data traffic flow control, or simply flow control, is a network process used to help manage the rate of data transfer between two source devices such as a base station and a user device.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
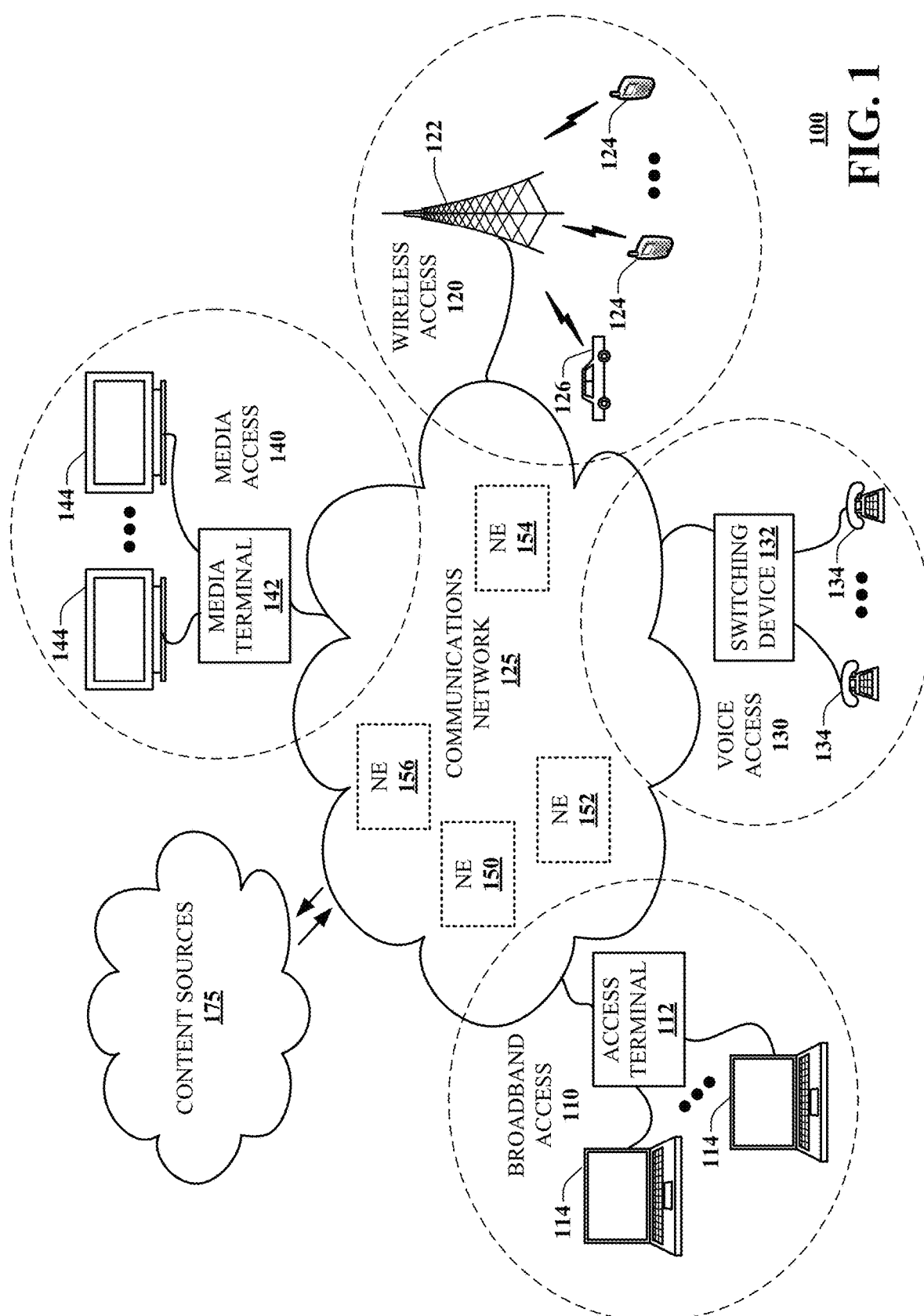
FIG. 1 is a block diagram illustrating an exemplary, non-limiting embodiment of a communications network in accordance with various aspects described herein.

The subject disclosure describes, among other things, illustrative embodiments for managing flow control in communication networks using artificial intelligence and machine learning. Other embodiments are described in the subject disclosure.

One or more aspects of the subject disclosure include establishing communication between one or more cells of a wireless communication network and a user equipment (UE) device, including communicating with the UE device over a plurality of aggregated radio carriers of the one or more cells of the wireless communication network, receiving a data packet for communication to the UE device via the one or more cells of the wireless communication network. Aspects of the subject disclosure further include receiving a set of packet-splitting rules which define conditions for splitting packets into a number of smaller data packets for transmission to the UE device, each smaller data packet of the number of smaller data packets including less data for transmission to the UE than the data packet, each smaller data packet including payload data, wherein payload data of all smaller data packets of the number of smaller data packets together forms payload data of the data packet, and receiving network information about current network conditions in the wireless communication network, the network information including information about data traffic to user equipment devices including the UE device and information about radio conditions of the UE device. Aspects of the subject disclosure further include providing, to a machine learning model, the set of packet-splitting rules and the information about current network conditions in the wireless communication network, receiving, from the machine learning model, a flow control arrangement for the data packet, wherein the receiving the flow control arrangement comprises receiving information defining a number of smaller packets to split the data packet into and receiving information defining respective carriers of the plurality of carriers of the wireless communications network for communication of respective data packets of the number of smaller data packets, and communicating the number of smaller data packets to the UE device according to the flow control arrangement for reassembly of the number of smaller data packets into a reassembled data packet by the UE device.

One or more aspects of the subject disclosure include training a machine learning model with training data, the training data including information about a network arrangement of a wireless communication network, historical network conditions of the wireless communication network, historical flow control selections for communicating data from the wireless communication network to user equipment (UE) devices using multiple aggregated carriers of the wireless communication network, and outcomes of the historical flow control selections. Aspects of the subject disclosure further include providing, to the machine learning model, a set of packet-splitting rules, wherein the set of packet-splitting rules define conditions for splitting data packets received at the processing system into smaller packets for transmission to the UE device, and receiving a data packet for communication to a UE device, the UE device in data communication over two or more radio carriers with one or more cells of the wireless communication network and providing, to the machine learning model, information about the data packet and the UE device and information about current network conditions for the wireless communication network. Aspects of the subject disclosure further include receiving, from the machine learning model, a flow control arrangement, the flow control arrangement selected by the machine learning model for the data packet, wherein the receiving the flow control arrangement comprises receiving information defining a number of smaller packets to split the data packet into and receiving information defining respective carriers of the multiple aggregated carriers of the wireless communications network for communicating respective smaller data packets of the number of smaller data packets, and communicating smaller data packets of the number of smaller data packets to the UE device according to the flow control arrangement for reassembly of the number of smaller data packets into a reassembled data packet by the UE device, the flow control arrangement selected by the machine learning model according to the set of packet-splitting rules, the information about the data packet and the UE device, and the information about current network conditions to ensure the reassembled data packet at the UE device matches the data packet at the processing system.

One or more aspects of the subject disclosure include receiving a data packet for transmission over a wireless network to a user equipment (UE) device in data communication with one or more network elements over one or more carrier legs of the wireless network, receiving information about current network conditions, retrieving a set of packet splitting rules which define initial boundary conditions for a process of splitting packets into smaller data packets for transmission to the UE device, applying, in a machine learning model, one or more packet splitting rules of the set of packet splitting rules to split the data packet into a set of smaller data packets, based on the information about current network conditions in the wireless network, selecting, in the machine learning model, a flow control arrangement for the data packet, including determining a number of smaller packets to split the data packet, and selecting respective carrier legs of the one or more carrier legs of the wireless network for communication of respective data packets of the number of smaller data packets, and communicating the number of smaller data packets to the UE device.

Referring now to FIG. 1, a block diagram is shown illustrating an example, non-limiting embodiment of a system 100 in accordance with various aspects described herein. For example, system 100 can facilitate in whole or in part managing flow control in a wireless network between the network and a user equipment device by providing current and historical information to a machine learning model to split data packets for communication over multiple carriers to the user equipment device and updating the machine learning model based on past flow control outcomes. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or another communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
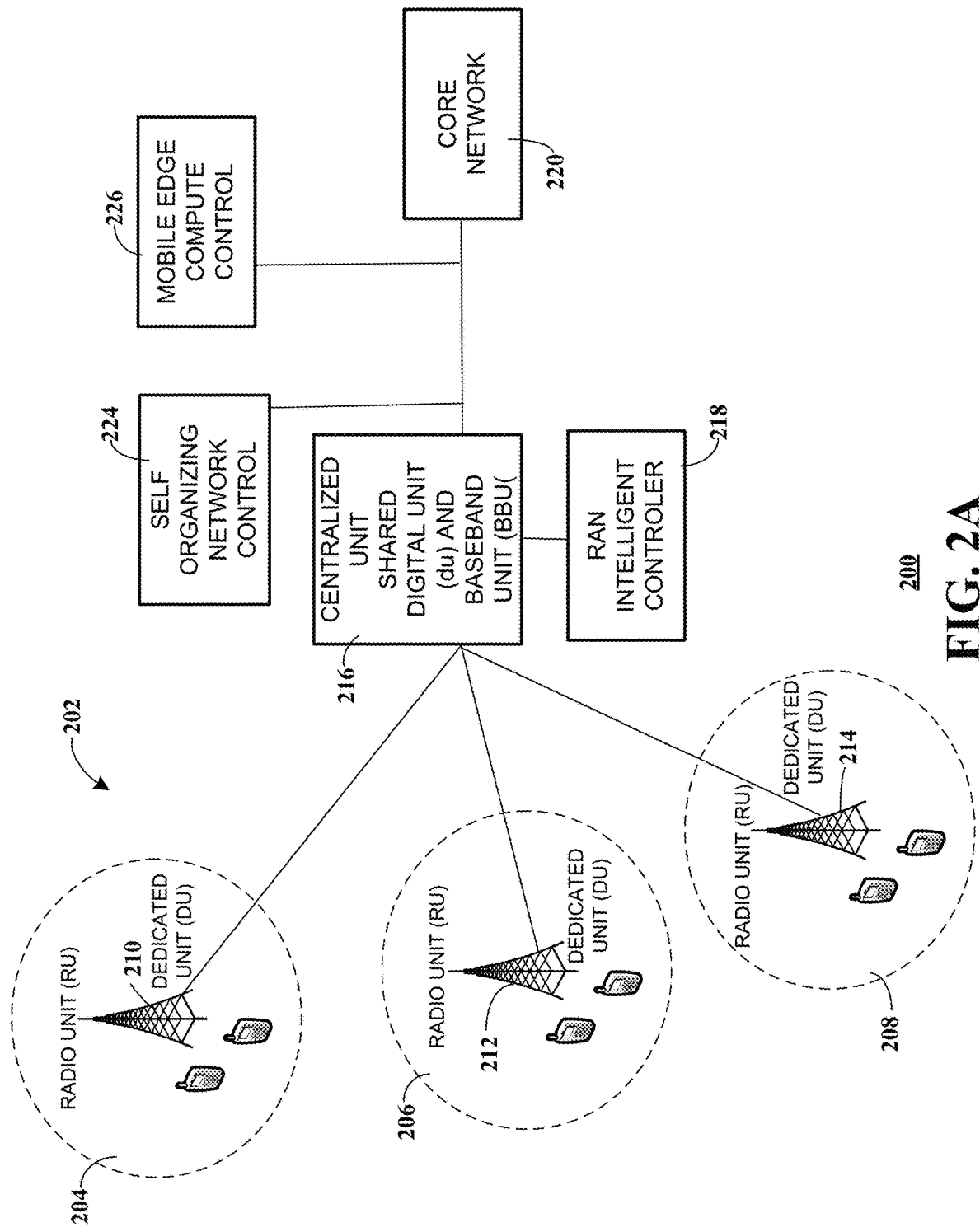
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a radio communication network 200 functioning within the communication network 125 of FIG. 1 in accordance with various aspects described herein. The radio communication network 200 is an exemplary embodiment of a network for radio communication among fixed parts such as base stations or access points and portable parts such as mobile devices.

Embodiments may have particular application in a radio communication system such as a cellular communication system. Such a system generally includes a plurality of cells in which each respective cell provides telecommunication service to a respective geographic area. In FIG. 1, wireless access 120 is an example of providing radio communication to a plurality of mobile devices 124 and vehicle 126 via base station or access point 122, The base station or wireless access 120 provides telecommunication service to compatible equipment in the geographic area served by the base station or wireless access 120. A cellular communication system may include a plurality of contiguous cells, each cell including a base station or access point 122 serving an assigned area. The base station or access point 122 provides radio communication services to mobile phones other devices in a cell. Such a cellular communication system may be referred to as a mobile communication system. As a mobile phone or other device moves from a first cell to an adjacent cell, radio communication with a particular base station or access point 122 is handed off to a target base station or access point serving the adjacent cell in a process known as handoff or handover.

The radio communication system may be a radio access network (RAN) which provides radio communication services to user equipment (UE) devices within a geographic area. The RAN may include a plurality of access points or base stations. The access points or base stations may be referred to as a Node B or evolved Node B or eNodeB or eNB or gNodeB or gNB or other names. The RAN may be in communication with a core network (CN) for connection to other communication services and for managing tasks such as UE registration and handoff. Each RAN operates according to a radio access technology. Examples of such radio access technologies include fifth generation cellular (5G), fourth generation cellular (4G) or Long-term Evolution (LTE), third generation cellular (3G), Universal Mobile Telecommunication System (UMTS), Evolved Universal Mobile Telecommunications System Terrestrial Radio Access Network (E-UTRAN) and others as well. Other examples of such radio access technologies include technologies and protocols to be developed in the future. The UE operates according to complementary radio access technology. The UE may be referred to as a mobile station (MS), portable part (PP) or new radio (NR) module, for example.

The radio communication network 200 in the exemplary embodiment of FIG. 2A includes three cells including a first cell 204, a second cell 206 and a third cell 208, a centralized unit (CU) 216, a radio access network (RAN) intelligent controller 218, and a core network 220. The first cell 204 is served by a first base station or first radio unit (RU) and remote dedicated unit or distributed unit (DU) 210 including a first baseband unit (BBU). The second cell 206 is served by a base station or second radio unit (RU) and remote dedicated unit or second distributed unit (DU) 212 including a second baseband unit (BBU). The third cell 208 is served by a third base station or third radio unit (RU) and remoted dedicated unit or distributed unit (DU) 214, including a third baseband unit (BBU). The CU 216 is in data communication with the core network 220.

In particular embodiments, a DU can either be located at the same network location as an RU or at a location that is remote from RU. Locating the DU remotely from the RU may be preferred currently in cloud-based solutions for DU topology. A shared BBU pool may conserve BBU resources compared to a dedicated DU. For example, if during a particular time, a cell is not using a dedicated DU, other cells can make use of the shared DU from the pool.

The three cells including the first cell 204, the second cell 206 and the third cell 208 together form a cluster 202. Each respective cell may be termed a network node. Each network node provides radio access to remaining portions of the network such as the core network 220. The structure and connection of radio communication network 200 is exemplary only. The radio communication network 200 may include any number of cells and base stations and other network components in data communication.

In the exemplary embodiment of FIG. 2A, the cluster 202 includes three cells. Particular embodiments may include any suitable number of cells in cluster 202, depending on network requirements, traffic levels and other factors. In typical embodiment, the cluster 202 may include dozens or hundreds of cells. Also, the number of cells in the cluster 202 may vary over time as network usage and build-out change and develop. For example, if the first cell 204 is divided into multiple smaller cells to manage increasing traffic levels, the smaller cells may be added to the cluster 202, increasing the number of cells in the cluster 202.

The radio communication network 200 implements a RAN using radio access technology. In the illustrated example, Third Generation Partnership Project (3GPP) NR 5G cellular network technology is implemented in the radio communication network 200. However, any suitable radio access technology now known or later developed, such as LTE or LTE-Advanced, may be selected and implemented. Various radio access technologies may be combined and interoperate in the radio communication network 200. As noted, the cluster 202 may include any suitable number of cells and it is anticipated that the cluster 202 will include a large number of cells, such as 100 cells served by 100 respective DUs.

The RU AND DU with dedicated BBUs 210, 212, 214 are logical network nodes that perform a subset of eNodeB functions. Each respective RU and DU with dedicated BBU provides mobile radio communication service to user equipment (UE) devices located in the respective cell served by the respective RU and DU with dedicated BBU. In the example of FIG. 2A, each respective RU and DU with dedicated BBU 210, 212, 214 is one DU of the cluster 202 of DUs serving respective geographically contiguous areas defined by the respective cells including first cell 204, second cell 206, and third cell 208 and operating substantially synchronously so that uplink transmissions are substantially synchronous among the DUs 210, 212, 214 of the cluster 202 and downlink transmissions are substantially synchronous among the DUs 210, 212, 214 of the cluster 202 to limit inter-cell interference.

Each RU and DU with dedicated BBU of the radio communication network 200, including first RU and DU with dedicated BBU 210, second RU and DU with dedicated BBU 212 and third RU and DU with dedicated BBU 214, is in communication with the CU 216. In some embodiments, each respective RU and DU with dedicated BBU is a remote radio head (RRH) or remote radio unit (RRU), providing radio frequency (RF) communication with UE in each respective cell. Each RU and DU with dedicated BBU, including first RU and DU with dedicated BBU 210, second RU and DU with dedicated BBU 212 and third RU and DU with dedicated BBU 214, may communicate with the CU 216 using fiber optic cable or other means of data communication.

The CU 216 provides control of the respective RU and DU with dedicated BBUs in the radio communication network 200. The CU 216 is a logical network node that performs a subset of eNodeB functions. Such functions may include transfer of user data, mobility control, radio access network sharing, positioning, session management, for example. The CU 216 provides baseband central control. The CU 216 generally controls the respective RU and DU with dedicated BBUs. The split of functionality between the CU 216 and RU and DU with dedicated BBUs such as RU and DU with dedicated BBU 210, RU and DU with dedicated BBU 212, and RU and DU with dedicated BBU 214, is established by the network operator of the radio communication network 200. Some embodiments may omit the CU 216 and provide direct control of an eNodeB or gNodeB at each RU and DU with dedicated BBU 210, 212, 214.

The CU 216 operates in conjunction with the RIC 218. The RIC 218 is a network node that controls certain aspects of the radio communication network 200. The RIC 218 provides access to some functions of the radio communication network 200. The RIC 218 may control operation of the CU 216 and respective DUs in the radio communication network 200.

In the illustrated embodiment, the radio communication network 200 includes a self-organizing network control module 224 and a mobile edge compute control 226. The self-organizing network control module 224 may control implementation of a self-organizing network in the radio communication network 200. A self-organizing network (SON) may include automation technology to make the planning, configuration, management, optimization and healing of mobile radio access networks simpler and faster to achieve. In a self-organizing network, newly added base stations may be self-configured. Currently operating base stations will self-optimize. The self-organizing operation may be coordinated or controlled by the self-organizing network control module 224. The self-organizing network control module 224 may be in communication with other elements of the radio communication network 200. The self-organizing network control module 224 collects network information and performs suitable analysis. Mobile edge computing, or multi-access edge compute (MEC) enables cloud computing capabilities at the edge of a cellular network such as the network formed by the cluster 202. By running applications and performing related processing tasks closer to the cellular customer, network congestion may be reduced and applications may perform better. MEC technology may be implemented at the cellular base stations or other edge nodes, and may enable flexible and rapid deployment of new applications and services for customers.

Communication between a UE device and a base station is conducted using carrier signals of specified frequency. Each base station may use multiple carriers or bands of frequencies to communicate with multiple UE devices in a cell. Each carrier may be referred to as a channel and may have individual channel characteristics besides frequency.

In some cases, multiple carriers may be combined or aggregated for communication between a UE device and a base station. Carrier aggregation (CA) is used in some radio access technologies such as LTE-Advanced and 5G in order to increase the communication bandwidth. Increasing bandwidth increases the bitrate of communication between a UE device and a base station such as eNodeB or gNodeB. In LTE Advanced and 5G systems, carrier aggregation (CA) is a technique used to enable the very high data rates of 4G and 5G cellular communication to be achieved. By combining more than one carrier together, either in the same or different bands, it is possible to increase the bandwidth available and, in this way, increase the capacity of the link between the UE device and the base station. Further, CA enables use of available radio spectrum to be maximized. Often, frequency bands of available spectrum are relatively small as the availability of spectrum is limited. Spectrum assignment may be made by government or other entities and may make available only small bands. Carrier aggregation seeks to be able to utilize both small bands and large bands more effectively and efficiently.

Carrier aggregation may be used in both Frequency Division Duplex (FDD) and Time Division Duplex (TDD) modes. In carrier aggregation, multiple frequency blocks, called component carriers, are assigned to the same user or UE device. 3GPP release-10 supports up to two Component Carriers (CCs) in a downlink (DL) and one CC in an uplink (UL). The maximum possible data rate per user is increased as more frequency blocks are assigned to a user. 3GPP release 12 allows 3 CCs in the downlink and 2 CCs in the uplink. Other systems and implementations may specify other arrangements including up to 6 CCs in each downlink and uplink.

CA allows mobile network operators to combine a number of separate LTE or 5G carriers. This enables the network operators to increase peak user data rates and overall capacity of their networks and to exploit fragmented spectrum allocations. Carrier aggregation can be used to combine carriers whether they are contiguous or even in the same frequency band.

Carrier aggregation can generally be used to increase throughput. Throughput refers to the actual amount of data or information that is successfully communicated over a communication link, such as between a UE device and the network. Throughput may be measured in Mbps or similar units. Carrier aggregation is usually configured with collocated cells operating in the same frequency band, which provide similar coverage. Conversely, carrier aggregation can also be configured on non-collocated cells with partial coverage overlap.

When carrier aggregation in an LTE or other network is enabled, it is necessary to be able to schedule the data across the carriers and to inform the terminal or user equipment of the downlink control information (DCI) rates for the different component carriers. Data can be scheduled to the UE using either cross-carrier scheduling or same carrier scheduling. In same carrier scheduling, downlink scheduling assignments are achieved on a per carrier basis, where they are valid for the component carrier on which they were transmitted. In cross-carrier scheduling, the physical downlink shared channel (PDSCH) on the downlink or the physical uplink shared channel (PUSCH) on the uplink is transmitted on an associated component carrier other than the physical downlink control channel (PDCCH). The carrier indicator in the PDCCH provides the information about the component carrier used for the PDSCH or PUSCH. This information is within the downlink control information and is called Carrier Indicator Field (CIF).

It is necessary to be able to indicate to which component carrier in any aggregation scheme a grant relates. To facilitate this, component carriers may be numbered. The primary component carrier is numbered zero, for all instances, and the different secondary component carriers are assigned a unique number through the UE-specific radio resource control (RRC) signaling. This means that even if the terminal or user equipment and the base station, eNodeB or gNodeB, may have different understandings of the component carrier numbering during reconfiguration, transmissions on the primary component carrier can be scheduled.

Carrier aggregation is generally triggered at the UE level. When the serving cell does not have enough resources to satisfy UE demand, a memory storage location UE-Buffer at the serving cell will begin to fill with data and may exceed a predefined threshold value (which may be referred to as CA.BUFFER.THRES in some embodiments). The threshold value may be any suitable value, such as 75 percent of maximum buffer capacity or 90 percent of buffer capacity. The threshold value may be programmable or variable, and may be different for different carriers or technologies, such as LTE versus 5G. If the buffer threshold value is exceeded, the serving cell will trigger carrier aggregation for this UE.

The serving cell and its carrier from which the UE device gets its system information may be referred to as the primary cell (PCell). Every other configured cell and their carriers may be referred to as a secondary cell (SCell). In embodiments, the PCell is responsible for cross-carrier scheduling of the secondary cells but not vice-versa. Further, in embodiments, the PCell cannot be cross scheduled. It is always scheduled through its own physical downlink control channel (PDCCH).

As noted, with carrier aggregation in one or more networks, it is necessary schedule the data across the carriers. This may be referred to as traffic data flow control or simply flow control. Flow control is a network process used to help manage the rate of data transfer between two source devices such as an eNodeB or gNodeB and a UE device. Flow control is used to help prevent a source device from overwhelming a destination device by sending more packets than the destination device can handle.

Traffic data flow control is important in wireless communications. Flow control has become more critical for 5G networks and beyond with the introduction of new technologies and combinations of technologies. Such new technologies include 5G Non-Standalone (NSA) cellular, 5G Standalone (SA) cellular, centralized RAN (CRAN) cellular and Open RAN (O-RAN) cellular. In some applications, flow control is essential for certain technologies. These technologies include carrier aggregation (CA), NSA E-UTRAN New Radio-Dual Connectivity (NSA ENDC) and SA New Radio Dual Connectivity (SA NR-DC). Flow control enables combination of multiple radio resources to improve the performance of 5G networks and later-developed technologies such as sixth generation (6G) cellular.

Carrier aggregation has a successful history from 4G/LTE networks. Carrier aggregation splits the traffic among multiple radio bands, such as two frequency bands (2CA), three frequency bands (3CA), four frequency bands (4CA), etc. Carrier aggregation relies on flow control to coordinate among the multiple frequency bands. For example, in a network employing NSA ENDC, connectivity is typically provided on at least one LTE carrier or leg and at least one NR carrier or leg. Split bearers in ENDC split the traffic between the LTE leg and the NR leg and flow control coordinates the traffic between the two legs. In another example, in a network employing NR-DC, connectivity is provided on a carrier or leg using a low-band carrier or leg, referred to as a sub-3 leg, and a high-band carrier or leg, such as a mmWave leg. Split bearers in NR-DC split the traffic between the sub-3 leg, and the mmWave leg. In this example as well, flow control coordinates the traffic between the two legs. In a further example, both ENDC and NR-DC can employ carrier aggregation in one or both legs, which further complicates the task of flow control.

In general, flow control is implemented at the network side and operates to split a large packet into small packets for transmission to a user equipment (UE) device. The UE device is responsible for reassembling the small packets. Packets may be split at different network levels for different configurations. For example, a large packet may be split in the Radio Link Control (RLC) layer for carrier aggregation. The RLC layer controls transfer of upper layer (packet data convergence layer, or PDCP layer) protocol data units (PDUs). In another example, a large packet may be split in the PDCP layer for ENDC or NR-DC dual connectivity aggregation. In yet another example, a large packet may be split into smaller packets in the Transmission Control Protocol (TCP) layer for CRAN and O-RAN aggregation from multiple radios networks. In yet another example, a large packet may be split into smaller packets in the application layer for video frame aggregation.

One challenge when implementing flow control is to reassemble the multiple small packets to the original large packet when the multiple small packets do not arrive at the UE in the original sequence or at approximately the same time. Reassembly can fail under a number of circumstances. For example, the UE may employ a reassembly timer to set a maximum time duration for reassembling received packets. The reassembly timer may expire, for example, when the timing difference between the two or more legs is too large so that all small packets are not received before the reassembly timer expires. In another example, the UE may maintain a data buffer holding received packets waiting to be reassembled. The data buffer may overflow with small packets as they are received if the large packet cannot be assembled due to a lost packet or other reasons. In another example, a packet arrives too late to be reassembled with other packets from the same original large packet, referred to as an out of window (OOW) delivery.

A variety of factors may affect flow control in a wireless network such as radio communication network 200. A first factor is the condition of the radio environment between the UE and the eNodeB or gNodeB, including factors like interference, a noisy channel, fading or loading. In general, if the condition of the radio environment is relatively better, with less noise, fading and lower traffic volume, packets transmitted from the eNodeB or gNodeB to the UE will be less split, larger, and contain relatively more data and more information. A single large packet may be split into only 2 or 3 smaller packets for transmission, for example, in a good-condition radio environment. On the other hand, in the presence of extreme noise and interference and high traffic volume, the eNodeB or gNodeB may tend to break up a large packet into more and more smaller packets to ensure reliable reception at the UE. A single large packet may be split into 10 or 15 smaller packets for transmission, for example, in a poor-condition radio environment. Definition of good condition and poor condition may vary across many variables and circumstances, including the particular geography and network topology of an individual eNodeB or gNodeB.

A second factor affecting flow control in a network is feedback from a lower network layer to an upper network layer to clear the upper layer buffer. This may occur because of a buffer overflow or lost packets or a timeout condition at the gNodeB or the eNodeB.

A third factor affecting flow control in a network relates to the size of the buffer of the UE that is holding the small packets that have been transmitted and received. Each packet contains a payload and control information and there is a degree of redundancy to the control information. If the large packet is split into many small packets, the buffer of the UE device may overflow or near a limit on capacity. The size of the buffer of the UE may therefore limit the number of smaller packets that can be made from the large packet at the eNodeB or the gNodeB.

A fourth set of factors affecting flow control in a network relates to a reassembly timer or an overflow timer at the UE which is receiving small packets, or out-of-window (OOW) delivery at the UE for small packets. A timer may expire or OOW condition may occur because one or more packets is delayed or lost after transmission by the eNodeB or gNodeB.

A fifth set of factors affecting flow control in a network relates to differences between legs in a carrier aggregation (CA) arrangement or a dual connection arrangement. For example, a UE may be using ENDC to receive data from a gNodeB using an LTE leg and a 5G leg. Each respective leg has associated timing including latency, data rate and error control conditions. For example, one leg may be more susceptible to transmission errors resulting in a lower relative data transfer rate than the other leg. Similarly, a mmWave 5G leg may have a higher intrinsic data transfer rate than an LTE leg. Further, some carriers have differing bandwidth values, such as 5 MHz or 20 Mhz. A 20 MHz carrier can convey more data than a 5 MHz carrier. Further, the two different carriers can receive packets in a different order than the packets were transmitted. Because of such differences, the delay between receipt of small packets forming a large packet that is broken up for flow control may be too great to permit that degree of packet segmentation for flow control at the eNodeB or the gNodeB.

A sixth factor affecting flow control in a network relates to carrier aggregation bandwidth. As indicated, a UE device receives data in a CA or dual connection arrangement. However, the two legs may have different bandwidths, resulting in a mismatch in data transfer rate between the two respective legs. The flow control operation may not be able to find appropriate timing and packetization to communicate packets to arrive at the same time, or at about the same time, due to the bandwidth mismatch between the two legs.

A seventh factor affecting flow control in a network relates to traffic loading at the cell. If a number of UE devices are present and active in the cell, the level of traffic may disrupt flow control to a particular UE device. Further, the number of UE devices active in the cell must share the resources of the cell. If the cell is heavily loaded, the flow control process may produce smaller packets for transmission to the UE.

An eighth factor affecting flow control in a network relates to scheduling priority in the media access control (MAC) layer at the network. Some MAC protocols provide for prioritization of transmissions over the network. For example, synchronous communications may be prioritized over isochronous data transmission to ensure reliable, timely reception of the synchronous data. Emergency voice calls may have a highest priority over all other data. Other services have delay sensitivity, such as streaming video conference. Further, some non-delay sensitive services employ a relatively long buffer at the application level. An example is streaming video which may use a 1 second or larger buffer at the application level so that transmission of streaming video packets is relatively insensitive to network delays usually on the order of dozens of milliseconds or less. However, for flow control in the network, the priorities of data to be communicated and other data in the network must be accommodated and packets scheduled according to data priorities.

One goal of flow control is to reduce the number of packet splits that are imposed on a data flow. For example, a user at a UE device in data communication with a network may request access to a streaming file, such as a video file encoded using MPEG video coding or other encoded format. The MPEG standard, as an example, defines three frame types including I-frames, P-frames and B-frames. I-frames or image frames are the least compressible but do not require other video frames to decode. P-frames or predicted picture frames can use data from previous frames and are more compressible than I-frames. B-frames or bi-directional predicted frames can use both previous frames and forward frames for data reference to get the highest amount of data compression. Transmission of a video file that is subjected to packet size reduction for the purpose of flow control may be affected by one or more of the factors noted, such as UE buffer size constraints and UE-end reassembly time or out-of-window condition. The content of data, such as P-frames and B-frames in an MPEG file, must be accommodated by the flow control process.

These noted factors greatly complicate the flow control problem, particularly in instances where carrier aggregation or dual connection is used. A large number of factors must be accommodated across a wide variety of operation conditions including heavy traffic loading, variability in UE devices, variability in availability of networks among versions of 4G cellular and 5G cellular. The level of complexity may be too much for conventional algorithm design and programming. Any suitable algorithm must take into consideration of all of these factors and more to make an optimal flow control decision on a scale of millisecond (ms) or less.

Accordingly, artificial intelligence and machine learning may be used to implement flow control in a wireless network and to consider all relevant factors, along with real-time feedback, with a goal of reducing the number of packet splits. Application of artificial intelligence and machine learning can operate to mitigate common flow control failures, such as expiration of the reassembly timer at the UE, out-of-window (OOW) packet reception, and buffer overflow. Further, application of artificial intelligence and machine learning can improve both spectrum efficiency and end user experience.

Figure 2B:
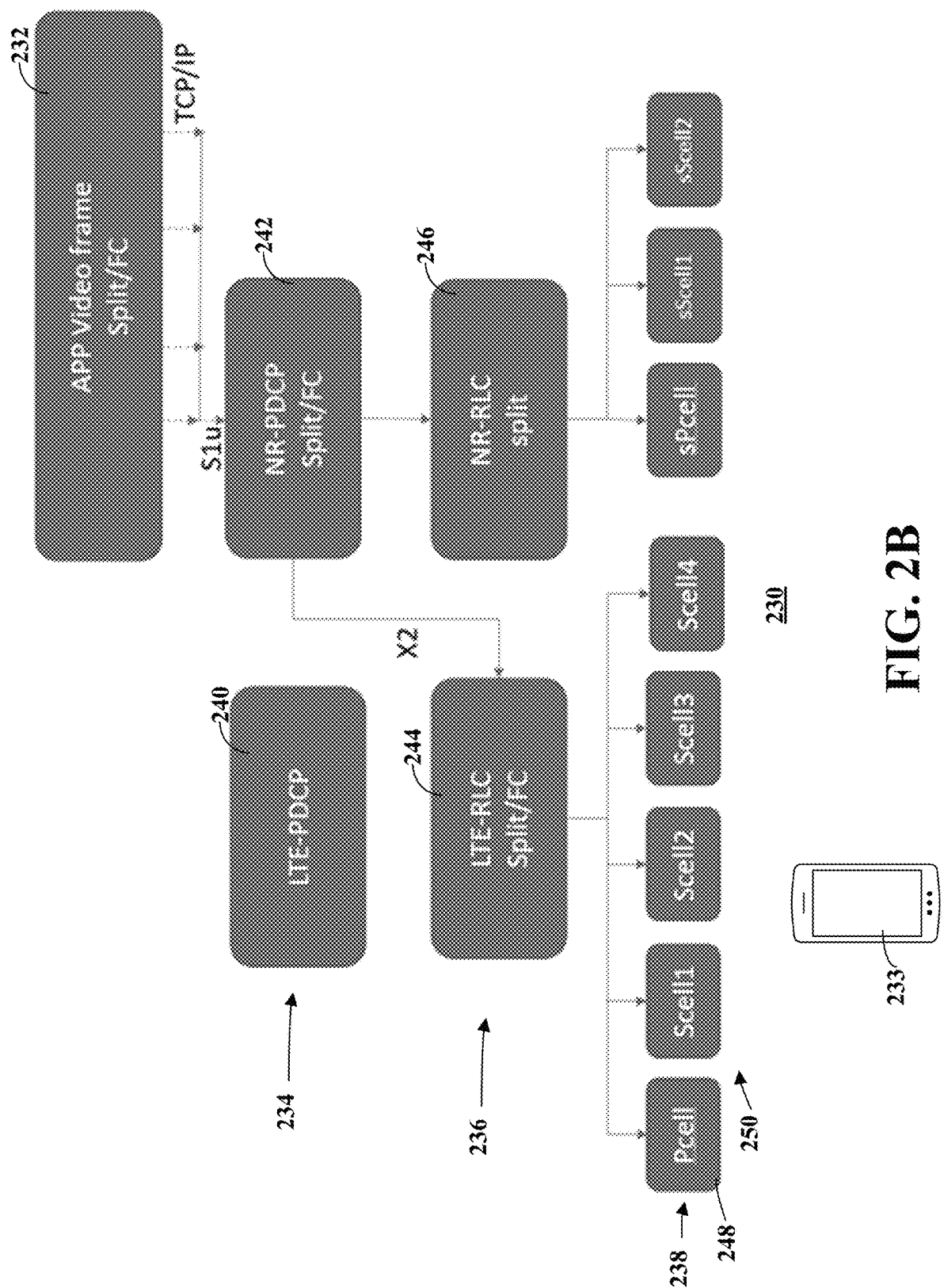
FIG. 2B illustrates a data transmission example in a network such as the radio communication network of FIG. 2A.

FIG. 2B illustrates a data transmission example of method 230 in a network such as radio communication network 200 of FIG. 2A. The example 230 includes an application 232 operating in a network element, such as a core network of a radio communication system, a Packet Data Convergence Protocol (PDCP) layer 234, a Radio Link Control (RLC) layer 236 and multiple cellular base stations 238. In the example 230, a video file is to be communicated from a network-level application 232 to an end-user device, smartphone 233, which employs a video player application such as YouTube®, to display the video file.

In the example, the network-level application 232 generates or communicates a video frame. The video frame is intended for an end user device such as the smartphone 233 in a radio communication network such as radio communication network 200 (FIG. 2A). The application 232 may operate in a core network such as core network 220 of radio communication network 200, or the application 232 may receive video data from a source external to the core network 220, such as over the public internet. In the example, the video frame is encoded as MPEG-4, but any video encoding format or standard or process may be used. The application 232 generates application layer packets such as transmission control protocol/internet protocol (TCP/IP) packets. Any suitable packet format may be used at the application layer, including for example the QUIC protocol. Each packet includes a payload and control information used to route the packet to the intended end user, such as a UE device in radio communication network 200.

Some applications employ relatively large size packets or segments or frames for data transmission. An example is transmission control protocol (TCP), which may have packets of 1500 bytes in length or longer. For reliable transmission, the packets may be split from large packets to smaller packets. The smaller packets have fewer bytes of data and are therefore smaller in size and require less time and resources per packet to transmit. However, the multiple smaller packets must arrive at the same time, or approximately the same time, at the end user device, such as a UE device like smartphone 233 receiving data over radio communication network 200. Where carrier aggregation or dual connection is used, the packets may be sent over two or more different paths. Flow control is used to control the operation of splitting large packets into smaller packets and routing the smaller packets over two or more CA paths.

In the example 230, the application 232 provides TCP/IP data to the PDCP layer 234. The application 232 may split TCP/IP packets into smaller frames or packets and apply flow control (FC). The PDCP layer 234 in the example 230 includes an LTE PDCP layer 240 and a New Radio (NR, e.g. 5G cellular) PDCP layer 242. The PDCP layer 234 generally employs a relatively large packet size. For example, in LTE, a PDCP service data unit (SDU) may have a maximum size of 8188 bytes.

The PDCP layer 234 communicates data to the RLC layer 236. The RLC layer in this example 230 includes an LTE RLC layer 244 and a NR RLC layer 246. In the example 230, an X2 interface couples the NR PDCP layer 242 with the LTE RLC layer. The X2 interface operates as an interface between respective radio access network (RAN) nodes. In the example 230, the NR PDCP layer 242 splits packets received from the application 232 into smaller packets to perform flow control. This packet splitting may be done for any suitable reason. For example, if the radio environment served by the LTE RLC layer 244 is noisy or congested, the flow control procedure may conclude to reduce the size of the transmitted packets and therefore split larger packets to smaller packets to thereby reduce susceptibility to interference. Moreover, the NR PDCP layer 242 may perform PDCP aggregation to implement E-UTRAN New Radio-Dual Connectivity (NSA ENDC) and New Radio Dual Connectivity (SA NR-DC). This serves to aggregate radio capacity from the LTE network and the NR network to the UE, smartphone 233.

The RLC layer 236, in particular the LTE RLC layer 244, may implement carrier aggregation. Each radio carrier from a base station has a relatively small bandwidth. To perform the carrier aggregation, the LTE RLC layer 244 further splits large packets to smaller packets. Carrier aggregation makes use of a primary cell or Pcell such as Pcell 248 and one or more secondary cells 250 such as Scell1, Scell2, Scell3 and Scell 4 in FIG. 2B.

Thus, in the example 230, from upper layers such as application layer 232 to lower layers such as Pcell 248 and Scells 250, packets are split when they are passed from an upper layer to a lower layer. However, this is only for the sending side of the duplex channel. The UE, smartphone 233, receives the small packets and reassembles the small packets into a frame. The packets must be received within a timing window to be properly assembled. However, it may occur that many packets cannot be received in the same window because of delays in the path, such as delays due to the X2 interface and because of varying radio conditions, for example between the primary cell 248 and secondary cells 250. Varying delay among the small packets received at the UE over different is very common.

Moreover, each layer requires feedback from a lower layer to an upper layer. The feedback must specify the state of a buffer at the lower layer. Flow control relates to limiting the amount of data provided from one layer to a next lower layer so that the buffers which store the small packets on the lower layer do not overflow. The feedback from the lower layer informs the flow control operation on the upper layer about the status of the buffer on the lower layer. For example, the UE buffer may be relatively small, holding only 50 ms of data received from the network. Buffer size is a limitation for small packets.

A further limitation at the UE is reassemble time. If packets arrive too later, the late arrival will trigger a timer. Further, an out-of-window (OOW) condition may be triggered as well by late-arriving packets. Packets may be received out of order or out of sequence. Each transmitted packet has a sequence number that is used to define the packet's proper place in the sequence of packets. If received out of order, the packets need to be reordered. Each of these represents an error condition and corresponds to missed data. Each of these may require retransmission of one or more packets by the application.

Accordingly, a large number and a variety of types of packet splits are imposed on packets communicated from the application 232 to the UE, smartphone 233. Each layer creates a further degree of packet splits and the packets must be reassembled at the UE. A flow control procedure or algorithm must understand, account for and accommodate each of these packet splits throughout the network. This is a very complicated and difficult problem to solve in a software solution.

A solution to these noted problems uses artificial intelligence (AI) or machine learning (ML), or a combination of these, generally referred to as AI/ML to implement flow control in a communication network such as radio communication network 200 in FIG. 2A. An AI/ML solution can consider all factors, including those noted herein, as well as real-time feedback about network operation, to reduce the number of packet splits. Accordingly, the AI/ML solution operates to mitigate failures as discussed herein including expired reassembly timer error, out-of-window error, and buffer overflow. Moreover, the AI/ML solution offers benefits of improving spectral efficiency and user experience.

Figure 2C:
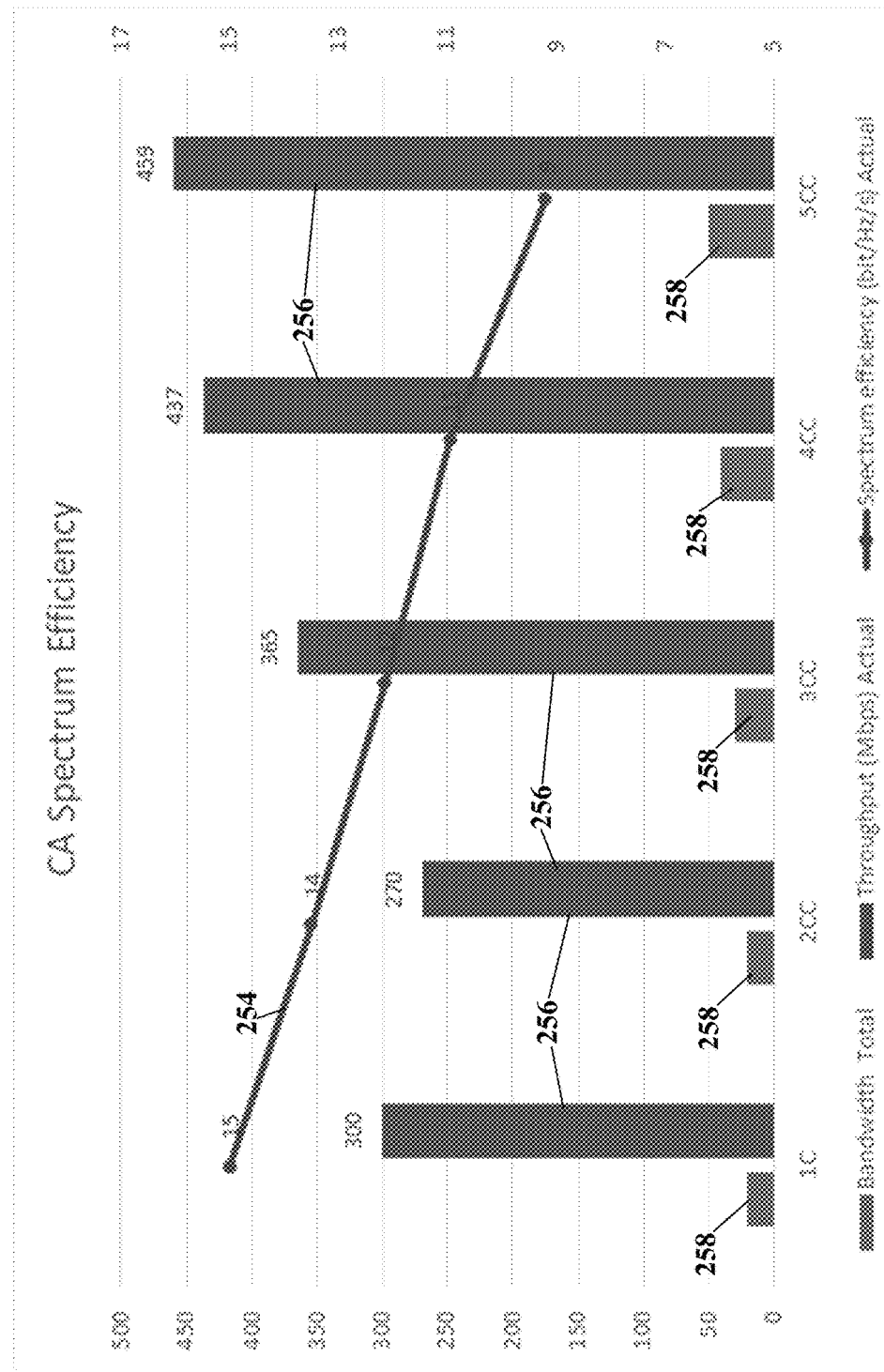
FIG. 2C illustrates total bandwidth, actual throughput and spectrum efficiency in a carrier aggregation environment in a typical LTE and 5G radio communication system.

FIG. 2C is a plot 252 illustrating total bandwidth of bottom left plot 256, actual throughput of top right plot 258 and spectrum efficiency 254 in a carrier aggregation environment in a typical LTE and 5G radio communication system for different number of component carriers (CC). Number of CC is shown on the abscissa, actual throughput in Mbps is shown on the left ordinate and spectrum efficiency in bit/Hz/s is shown on the right ordinate. Data is shown for the case of a single carrier, two component carriers (2CC), three component carriers (3CC), four component carriers (4CC) and five component carriers (5CC).

FIG. 2C illustrates that spectrum efficiency 254 decreases with increasing number of aggregated carriers. The 5CC example shows larger bandwidth of bottom left plot 256 than all other combinations. However, the 5CC example receives the lowest spectrum efficiency 254 of 9 bits/Hz/s. In contrast, for a single carrier system 1CC, spectrum efficiency is approximately 15 bits/Hz/s. Thus, the spectrum efficiency 254 decreases to about 60 percent using 5CC carrier aggregation in this example.

Further, in the example, a single carrier 1CC system receives 300 Mbps throughput while a 2 carrier 2CC system shows a decrease to 270 Mbps throughput. This is due to flow control issues noted above as well as overhead due to carrier aggregation. Similarly, at the 3CC case of three aggregated carriers, the throughput increases only to 365 Mbps despite the aggregation of three 10 MHz carriers. At each step, the combined bandwidth for the aggregated carriers (10, 20, 30, 40, 50 MHz, for example) multiplied by the spectrum efficiency in bit/Hz/s should give the throughput in Mbps. However, the throughput values are seen to roll off as spectrum efficiency decreases as number of carriers are added. However, a throughput of 459 Mbps, in the 5CC example, is not typically needed by any single user or any application providing data to a user. Accordingly, typically, 2CC or 3CC is used by or assigned to a particular user or UE device. However, in a case of a buffering triggering algorithm, if an application is providing substantial amounts of data to a buffer and the buffer begins to fill, 5CC or a similar option may be selected to increase throughput temporarily to empty the buffer and provide the buffered data to the user.

The example of FIG. 2C may be considered an example of diminishing returns for increased application of network resources. As more carriers are added to a communication link between the network and the UE, the throughput does not scale linearly. Rather, the throughput of top right plot 258 scales less than linearly. To a large degree, the diminishing returns are due to the complexity of the system and the number of decisions to be made, and the requirements imposed on a scheduler, managing five-carrier aggregation among many UE devices in a cell, on a millisecond basis. Conventional scheduler algorithms are inadequate to handle these tasks.

Without improvement to the flow control process, the efficiency of adding more carriers in a carrier aggregation system will continue to decrease. Network operators and users will not get full benefit from adding more carriers. 5G NR specifications support carrier aggregation up to 16 CC. However, as indicated in FIG. 2C, spectrum efficiency and network throughput are plateauing at 5CC. Use of artificial intelligence and machine learning or a combination of these enables the full benefit of carrier aggregation up to 16 CC and beyond to be realized.

Figure 2D:
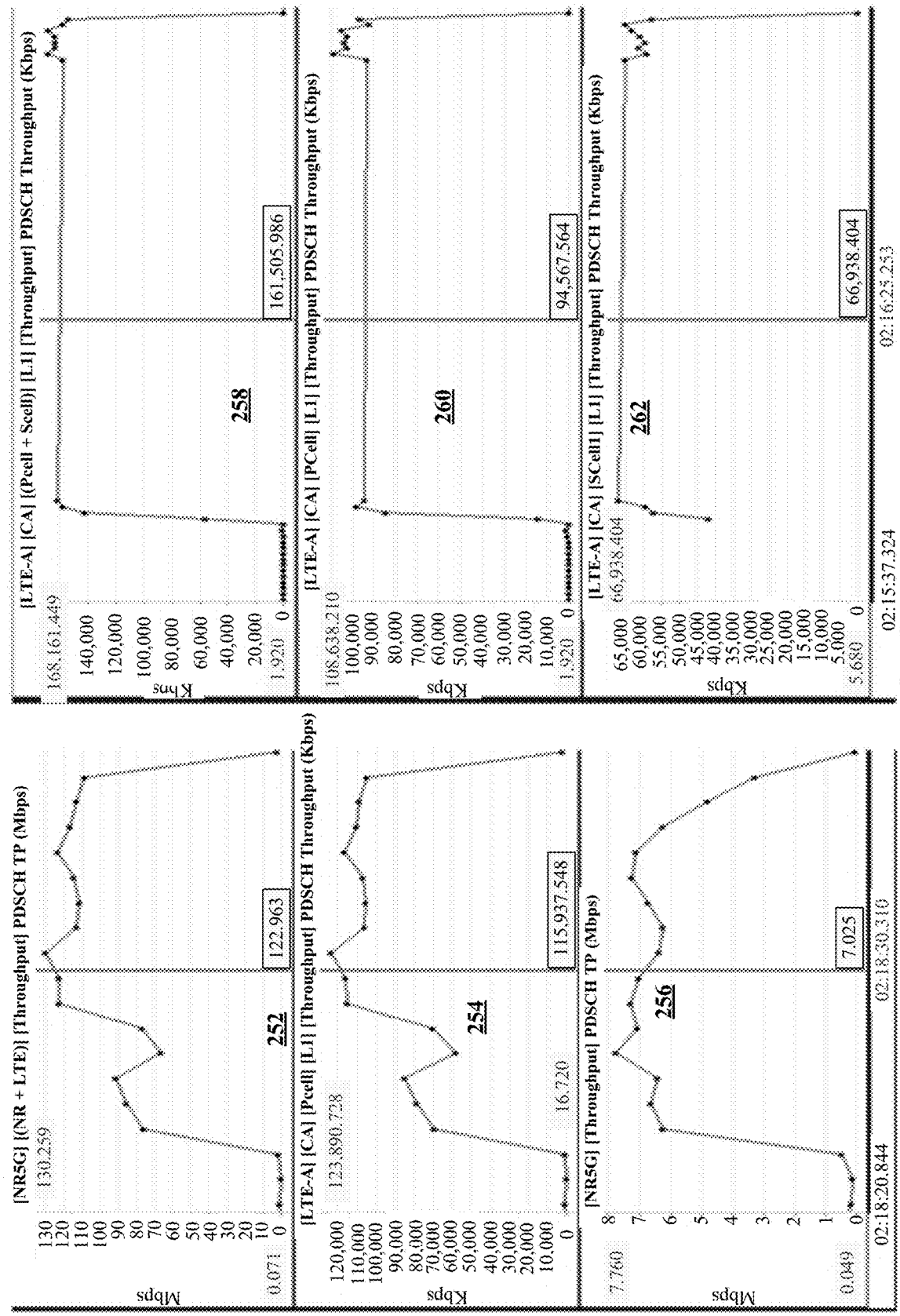
FIG. 2D is a series of plots illustrating actual throughput in a variety of carrier aggregation environments using typical LTE and 5G radio communication systems.

FIG. 2D is a series of plots illustrating qualitatively throughput in a variety of carrier aggregation environments using typical LTE and 5G radio communication systems. In particular, an ENDC system is contrasted with a non-ENDC system.

On the left-hand side of FIG. 2D, PDCP aggregation provides dual connection to both an NR system and an LTE system. A top left plot 252 shows throughput for a ENDC arrangement combining carriers from a NR and an LTE network. Middle left plot 254 shows throughput for an LTE system. Bottom left plot 256 shows throughput in 5G NR network. In each case, the throughput plots are very unstable. This is because of poor flow control. For example, delays between the NR leg and the LTE leg are not balanced. Moreover, the bandwidth between the NR leg and the LTE leg are not balanced. When the two legs are combined, as illustrated in top left plot 252, the throughput varies substantially across the abscissa.

The right-hand side of FIG. 2D shows carrier aggregation for an LTE-only network including a PCell and one Scell. Top right plot 258 shows combined throughput. Middle right plot 260 shows throughput for the LTE PCell only. Bottom right plot 262 shows throughput for the LTE SCell only. The throughput in each example is much more stable, much more consistent from left to right across the abscissa of each plot 258, 260, 262 relative to the ENDC plots on the left-hand side of FIG. 2D.

Thus, the ENDC aggregation arrangement on the left-hand side of FIG. 2D gains the benefit of the NR technology but the result is unstable throughput values for the end user. This may result in unpredictable network behavior from the perspective of the end user and poor perceived performance.

Conventionally, flow control is established in software by defining a set of rules that define how flow control should happen, substantially in real time. However, with the advent of carrier aggregation, including aggregation of 4, 5, and up to 16 and more carriers, in an environment that requires response on the order of microseconds, the flow control problem has become too complex for a conventional software solution.

Figure 2E:
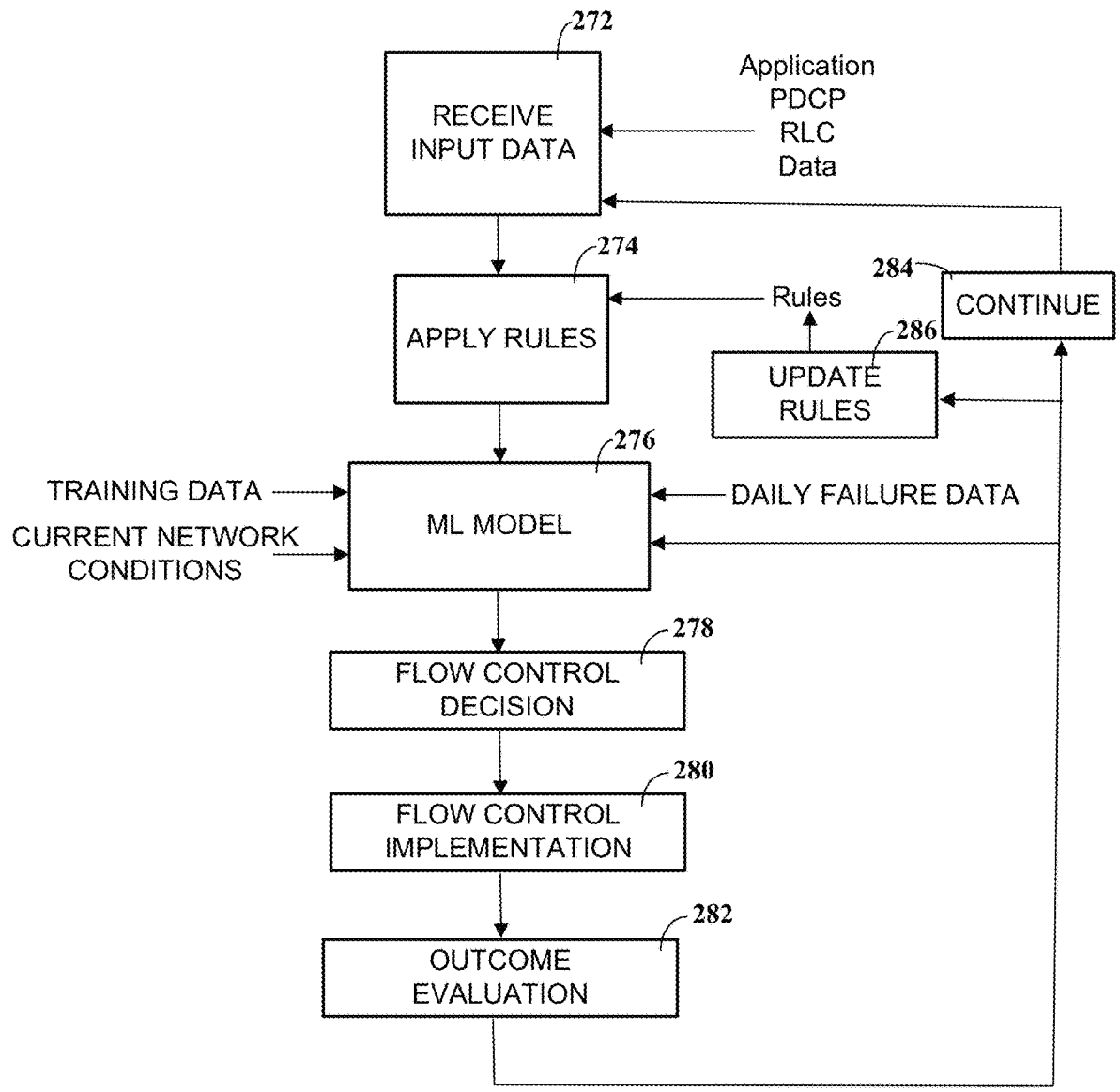
FIG. 2E depicts an illustrative embodiment of a method in accordance with various aspects described herein.

FIG. 2E depicts an illustrative embodiment of a method 270 in accordance with various aspects described herein. The method 270 represents one embodiment of an Artificial Intelligence/Machine Learning (AI/ML) flow control process which can consider all factors and real time feedback in a mobility network and can reduce the number of packet splits, for example. Steps of the method 270 may be performed at any suitable location or combination of locations in a communication network such as communication network 200. For example, some or all of the steps of the method may be performed at an application operating in the core network 220, at a centralized unit 216 or at one or more base stations or distributed units such as DU 210, DU 212 or DU 212. Various components may cooperate in performing the method such as by sharing data, sharing processing of data, and sharing the results of individual steps.

At step 272, the method 270 includes receiving input data. The input data may include information about the current status of the network, active applications, active devices and status of network components. In embodiments, the received information includes information about applications providing data to UE devices, such as streaming video provided to UE devices or UE devices involved in a current voice call or other activities or applications. The applications may be active within the communication network, such as one or more UE devices or in the core network, or the applications may be active outside the network, such as at a third-party site accessed over the public intranet through a network gateway. The information may include status information such as numbers and identification of UE devices attached to the network, carrier aggregation status of UE devices including information about current carrier assignments, and information about active or impending handover of UE devices among eNodeB or gNodeB.

Still further, the information received at step 272 may include information about the PDCP layer and RLC layer of the network which are communicating with UE devices and making decision about packet splits. Such information may include network configuration and changes to network configuration as devices are added to the network or taken offline. Such information may include information about network loading, network capacity and excess network capacity.

As described about in conjunction with FIG. 2B, large packets to be communicated to UE devices by the network may be split into smaller packets. Packet splitting may be done for a variety of reasons. The packet splits may occur at any level in the network, including the TCP layer, the PDCP layer and the RLC layer. Packet splits may be cumulative. For example, an application may generate packets of video data at the TCP level in the core network. The core network may conclude to split large application packets into smaller packets. Similarly, the PDCP layer or the RLC layer may conclude to further split packets into still smaller packets.

As noted, information received at step 272 may include information about carrier aggregation for various UE devices. For example, a particular UE device may be sharing two or more carriers of an eNodeB or gNodeB with designations such as 2CC, 3CC up to 16CC and beyond. The aggregated carriers may use different technologies, such as 5GNSA (Non-Standalone), 5G SA (Standalone), CRAN (centralized RAN) and O-RAN (Open RAN), as well as NSA ENDC (E-UTRAN New Radio-Dual Connectivity) and SA NR-DC (New Radio Dual Connectivity). Carrier aggregation combines multiple radio resources to improve the performance of 5G cellular networks and beyond, such as 6G cellular networks.

Flow control is essential for carrier aggregation or dual connection to successfully improve network performance. Flow control is a network process used to help manage the rate of data transfer between two source devices such as an eNodeB or gNodeB and a UE device. Flow control is used to help prevent a source device from overwhelming a destination device by sending more packets than the destination device can handle. Flow control may include splitting packets such that a first packet or set of packets is communicated on a first carrier aggregation leg to the UE device and a second packet or set of packets is communication on one or more other carrier aggregation legs. The UE device must receive and reassemble the small packets into a large packet.

As explained in conjunction with FIG. 2C and FIG. 2D, excessive packet splitting may affect overall carrier aggregation spectrum efficiency and throughput. In particular, carrier aggregation beyond the level of 3CC can result in little improvement in spectrum efficiency.

The result of step 272 is a stream of information to be provided to UE devices operating in a cell and having access to LTE and 5G carrier aggregation or dual connection, with up to 16 CC on the downlink from the eNodeB or gNodeB to the user. This information may change or be updated at a Transmission Time Interval (TTI). In LTE systems, TTI is set at 1 ms. In 5G systems, TTI can vary from 62.5 µs to 1 ms in the current published 3GPP specifications. Other radio systems may use different TTI values. Accordingly, flow control decisions may be made at the rate of every millisecond or up to every 62.5 µs. Flow control decisions must be made about this flow of information.

At step 274, a set of rules for packet-splitting are obtained and applied to the input data of step 272. The rules of step 274 set an initial boundary for the decisions made by an artificial intelligence or machine learning flow control model when deployed in the production network. During subsequent operation, the rules of step 274 may be modified or supplemented based on decisions made by a machine learning model and based on the results of a flow control implementation selected by the machine learning model and its success or failure. As the system operates to implement flow control processes, the number of inputs and variables increases to quickly overwhelm a human programmer or system designer. However, implementing a machine learning model, with rules such as the following to set a boundary condition or starting point for the machine learning model, allows the Artificial Intelligence/Machine Learning (AI/ML) flow control process to consider all factors and the real time feedback to reduce the number of packet splits. In one exemplary embodiment, the following rules may be received and applied at step 274.

1. A single large packet may not be split to more than 10 small packets. This reduces the number of packets that may be sent and recovered, and reduces the likelihood of a packet being lost or other packet error. Any suitable value or number of packets, such as 10 or 15, may be chosen, and as the machine learning model learns about network behavior, the threshold value may be modified to be larger or smaller by the machine learning model.
2. The timing difference between any two carrier aggregation legs shall not exceed a threshold value of 50 ms. Otherwise, the small packets shall be communicated via one of carrier aggregation legs. The UE device scheduled to receive the packets may report information about timing of the two or more carrier aggregation legs assigned to the UE device. The UE device may report actual timing or time delay information, or the UE device may report a time difference. Alternatively, the UE device may acknowledge receipt of a packet, including for example a time stamp corresponding to time of receipt of the packet, and the network element transmitting the packets may note the time stamp of the acknowledgment. The timing delay through the leg may be determined based on the reported time stamp for acknowledgement of the packet with a time stamp for transmission of the packet. This rule reduces the likelihood of re-assembly timer expiration, data buffer overflows and out of window delivery of packets. The threshold value of 50 ms is an exemplary value. Any suitable threshold value may be chosen, and as the machine learning model learns about network behavior, the threshold value may be modified to be larger or smaller by the machine learning model.
3. The P-frames of a video shall not be split. P-frames or predicted picture frames can use data from previous frames of a video file. Because of the frame dependency, this rule can increase robustness of flow control and reduce likelihood of error.
4. The packets of a latency-sensitive service shall not be split. One example of a latency-sensitive service is Ultra-Reliable and low-latency communications (URLLC) service. URLLC service was introduced in 5G cellular systems to support use cases with stringent requirements for extremely low latency, such as 1 ms, and high reliability, such as 99.999 percent. Examples of such use cases or applications include public safety, remote diagnosis or surgery, emergency response, autonomous driving, smart energy and smart grid. Because of the high-priority given to low-latency services, a rule against packet splitting for such services reduces likelihood of packet errors.
5. The UE end of a communication must acknowledge of the receipt of the packets within 10 ms. Rapid acknowledgement of receipt of packets provides feedback which closes the loop and ensures reliable communication. If a packet is not acknowledged and must be resent, it can indeed be resent before an out of window error or other packet failure occurs. Any suitable threshold value may be chosen, such as 10 ms or 20 ms, and as the machine learning model learns about network behavior, the threshold value may be modified to be larger or smaller by the machine learning model.
6. When the receive buffer at the UE end reaches 70% full, the UE end shall notify the sending end. Flow control is used to ensure that packets are not sent to a receive buffer, such as at the UE device on the downlink, when the buffer is already full. This rule establishes a threshold that may be considered a conservative threshold for the receive buffer. Any suitable threshold value may be chosen, such as 70 percent, 60 percent or 90 percent, and as the machine learning model learns about network behavior, the threshold value may be modified to be larger or smaller by the machine learning model.
7. If the throughput data rate required by an application is under 10 Mbps, use 3CC or less. In the example of FIG. 2C, 1CC, 2CC and 3CC arrangements aggregate one to three carriers to provide, for example, 300 to 365 Mbps throughput data rate. Any suitable threshold value for the throughput data rate may be chosen, such as 1 Mbps, 5 Mbps, 25 Mbps, etc.

Other rules may be used in addition to or in place of the noted rules. Moreover, as noted, a machine learning model or artificial intelligence module may learn about network behavior or response and modify the rules, including modifying threshold values and adding additional rules. In embodiments, these rules may serve as starting points to train the machine learning model. The machine learning model will eventually be able to optimize these rules.

Those rules are applied to the input data to make packet splitting decisions at the application or core level and at the PDCP level or at the RLC level. Thus, for example, if an app in the core is providing a streaming MP4 video, no P frames from that video file will be split into smaller packets in accordance with the third rule stated above. This rule may be applied by a processing system including a processor and memory in the core network of a network provider, such as core network 220 of FIG. 2A. Similarly, a network element such as RAN intelligent controller 218 of FIG. 2A, operating at the RLC level, may consider splitting a packet or group of packets in an area of heavy congestion in a particular cell such as cell 204 of FIG. 2A. Based on the first rule stated above, the RAN intelligent controller 218 will split the large packets into no more than 10 smaller packets before transmission to a UE device in cell 204.

Further, step 274 may receive as an input feedback information about previous outcomes from previous flow control processes. This feedback information provides information about the success or failure of previous attempts to implement flow control. The result may be to modify or change one or more of the existing rules to reflect the previous success or failure. The result may be to add new rules based on the success or failure. Further, the result may be to delete previous rules, again based on the success or failure of previous flow control processes.

In an example, the rule against splitting large packets into no more than 10 smaller packets before transmission to a UE device may be modified if it is determined that 10 smaller packets are too many packets. The rule may be modified to limit splitting to no more than 5 packets. In another example, a rule against splitting the large packets into no more than 10 smaller packets before transmission to a UE device may be modified to include or specify that the rule applies only for flow control in a link that includes stand-alone, New Radio Dual Connectivity (SA NR-DC).

At step 276, following application of the rules to the input data, flow control input information is applied to a machine learning model. The machine learning (ML) model can be a deep learning model, such as a neural network. In some embodiments, the ML model may use unsupervised learning to analyze and cluster untagged or unlabeled datasets. For example, the ML model may use unsupervised learning for data mining to group unlabeled data.

Three categories of machine learning implementations are currently used. These include supervised learning, unsupervised learning and reinforcement learning. In supervised learning, the machine learning model uses labeled data or information for training an algorithm. With labelled data, each example in a training dataset is tagged with the answer the algorithm should determine. Given an input, the machine learning model produces a successful output or a failure. The model will learn from the successful and failure results by evaluation results of individual inputs.

In unsupervised learning, the outcome from any given input is unknown. The training dataset is a collection of examples without a specific desired outcome or result. In unsupervised learning, inputs are provided that cover a large number or all cases for many parameters. The model learns by itself to know under each situation, what decision to make, to lead to the optimum outcome.

For managing flow control in a mobile communications network, where the number of inputs is very large, with many possible values, unsupervised learning may provide the best machine learning model to accommodate the many possibilities. In other embodiments, during initial training and operation of the machine learning model, supervised learning may be most optimal, followed by unsupervised learning. Once the flow control environment becomes too complicated for human management in a reasonable time frame, with too many inputs to consider and too many outputs to select, the machine learning model may be switched to unsupervised learning and permitted to develop its own understanding of network operation and control over time. Any suitable threshold may be set for switching from supervised learning to unsupervised learning.

In reinforcement learning, the artificial intelligence agent or machine learning algorithm is provided a reward for accomplishing a particular goal or task. The agent or algorithm can rely in training from past feedback as well as exploration of new strategies for solving a problem.

In addition to the flow control input information, the ML model at step 276 receives training data including periodic information about operation of the network. Based on this training data, the ML model evolves to learn how to respond to an increasing number of situations, including data flow, types of data, volume of data, number of UEs present in a cell, network availability, etc., over time. This is historical data about past network operations, including flow control failures, where a flow control arrangement was set but failed due to some reason.

The ML model further receives training data including periodic information about operation of the network. Based on this training data, the ML model evolves to learn how to respond to an increasing number of situations, including data flow, types of data, volume of data, number of UEs present in a cell, network availability, etc., over time. This is historical data about past network operations, including flow control failures, where a flow control arrangement was set but failed due to some reason.

Further, the ML model receives information about current network conditions, such as number of UE devices active in a cell and the related cell data traffic load, a number of UE devices entering or exiting the cell, current carrier assignments and availability of additional carriers for assignment. Other network conditions relate to different radio conditions experienced by a particular UE device. For example, if the particular UE device is near the center of the cell and the transmitter and receiver of a eNodeB or gNodeB, at the edge of the cell remote from the transmitter and receiver, or in the middle of the cell, relative radio conditions such as noise, interference, fading, and multipath interference will vary for the UE device. Other network conditions relate to the environment of the cell, such as an urban environment with many buildings and other sources of interference, a rural environment with fewer structures but where UE devices may be more distant from base stations, or suburban environments which may be mixed in nature. Other network conditions relate to use of small cells or microcells in some environments where the UE device may be physically close to the cell but the environment may be noisy because of other device traffic and handovers may be more frequent. Other network conditions relate to possibility of core network congestion, in which delays occur between the core network or remote network facilities beyond a network gateway, and the delays must be accommodated in the radio network. Other network conditions relate to a relative speed or velocity of mobility of the UE device which can affect radio performance and can increase the frequency of handovers with the network. Current network conditions may be received from any source of information in the network.

Further, the ML model receives feedback information. In some embodiments, the feedback information includes information about past failures and successes of prior flow control decisions, referred to as failure data. The failure data may be collected by a process outside the method 270, including for example any network component or group of components such the UE device, gNodeB devices, and others. The failure data may further come from a process or outcome evaluation that is part of the method 270 itself.

The failure data may be presented in any suitable format. Generally, the failure data includes timestamp information, information defining the data source and data destination for a particular flow control decision made by the ML model, and information about the result of the particular flow control decision. The results information may be qualitative, such as a binary pass-fail, successful-unsuccessful indicator. In other embodiments, the results information may be qualitative, providing information about the success of packet reconstruction at the UE device following a flow control decision and implementation of that decision.

At step 278, the method 270 includes making a flow control decision. That is, a decision is that may include a process of breaking a current packet of data into smaller packets, a process of deciding one or more legs between the network and the UE device for routing the packets, and a process of routing the smaller packets over one or more legs or carriers of a carrier aggregated link between the wireless network and a UE device. Some processes may be automated such as packetizing data and communicating data packets to the UE over a radio access network. Step 280 includes a process of implementing the flow control decision, including, for example, establishing the network connections and carrier assignments, packetizing the data and transmitting the data.

Step 282 includes a process of outcome evaluation. Step 282 includes evaluating the success or failure of the flow control implementation of step 280. For example, the reliability of data transfer may be estimated and compared with a threshold, such as comparing a number of lost packets compared with a lost packet threshold, or comparing a data throughput value or estimation with a data throughput threshold. Values for number of lost packets, data throughput or other parameters may be obtained from any source or combination of sources in the network. Any suitable parameter or key performance indicator may be evaluated at step 282.

Further, step 282 may include a process of determining what modifications to the processes of method 270 may be made or should be made. For example, rules applied at step 274 may be modified, such as reducing the amount of time within which the UE must acknowledge receipt of packets from 10 ms to 8 ms or any other value. The rules outlined herein are exemplary only and intended to be an initial set of rules with an initial set of values. The values or thresholds of the rules may be updated or modified on an ongoing basis to reflect the experience of the flow control method and the flow control implementation of step 280. The rules may be modified or fine-tuned, such as specifying that, in general, new rules may be added, such specifying that, in general the amount of time within which the UE must acknowledge receipt of packets is 10 ms, but for a subset of gNodeB devices serving a particular cell the threshold may be extended to 15 ms. Further, new rules may be added as the machine learning model develops a fuller understanding of network operation. For example, a new rule of limiting carrier aggregation to no more than 10 percent of active UE devices in a cell during specified times when traffic in the cell exceeds a threshold, such as 100 active devices in the cell, may be devised and implemented by the machine learning model as part of the outcome evaluation process of step 282.

Modification of existing rules or development of new rules may be done by any suitable process, including by the machine learning model of step 276. As the ML model learns and develops and understanding of the network and traffic in the network over time, the ML model will develop rule modifications and new rules to better implement flow control for the network and for devices in the network. Results of the outcome evaluation process of step 282 may be provided to any suitable device or process, such as the apply rules process of step 274 and the machine learning model of step 276. Step 286 illustrates one embodiment for modifying or updating the rules used by the machine learning mode of step 276.

At step 284, the method 270 returns to step 272 to receive additional input data and continue processing. For example, following a decision to break up a large packet into a smaller number of packets during a first pass through step of the method 270, following step 284, the method 270 may include receiving a subsequent packet to process. In another example, following step 284, the method 270 may receive input data indicating that an eNodeB or gNodeB has been added to the network and is available to begin service. Subsequent steps of the method 270 involve making flow control decisions, now using the information about the added availability of the new eNodeB or gNodeB. The method 270 may continue operating to process data and varying input conditions.

A system and method in accordance with aspects described herein can provide many benefits to a communications system such as a wireless communications system. For example, use of AI/ML flow control can simplify the current flow control algorithm applied at all layers, including the application layer, the PDCP layer and the radio link control layer. Further, the system and method can reduce the size of data buffers in all layers by reducing packet splits. For current and next generation network technologies, such as carrier aggregation, ENDC, NR-DC, CRAN and ORAN, using artificial intelligence or machine learning to manage flow control can help deliver the benefits of these respective technologies. Further, use of artificial intelligence or machine learning to manage flow control can improve spectrum efficiency by up to forth percent.

While for purposes of simplicity of explanation, the respective processes are shown and described as a series of blocks in FIG. 2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram of a communication network 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of radio communication network 200, and method 230 presented in FIGS. 1, 2A, 2B, 2C, 2D, 2E, and 3. For example, virtualized communication network 300 can facilitate in whole or in part managing flow control in a wireless network between the network and a user equipment device by providing current and historical information to a machine learning model to split data packets for communication over multiple carriers to the user equipment device, and updating the machine learning model based on past flow control outcomes.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
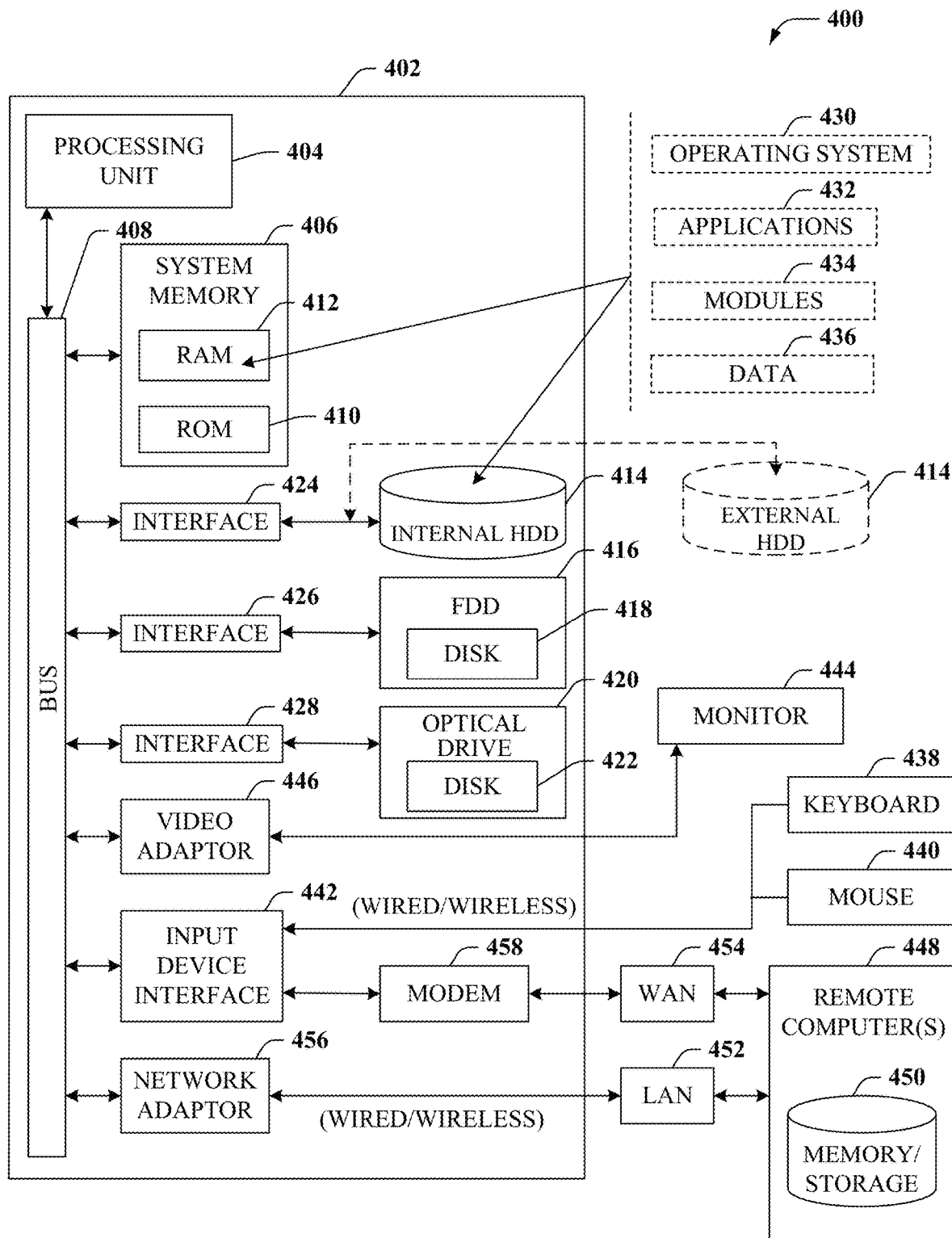
FIG. 4 is a block diagram of an example, non-limiting embodiment of a computing environment in accordance with various aspects described herein.

Turning now to FIG. 4, there is illustrated a block diagram of a computing environment 400 in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part managing flow control in a wireless network between the network and a user equipment device by providing current and historical information to a machine learning model to split data packets for communication over multiple carriers to the user equipment device, and updating the machine learning model based on past flow control outcomes.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
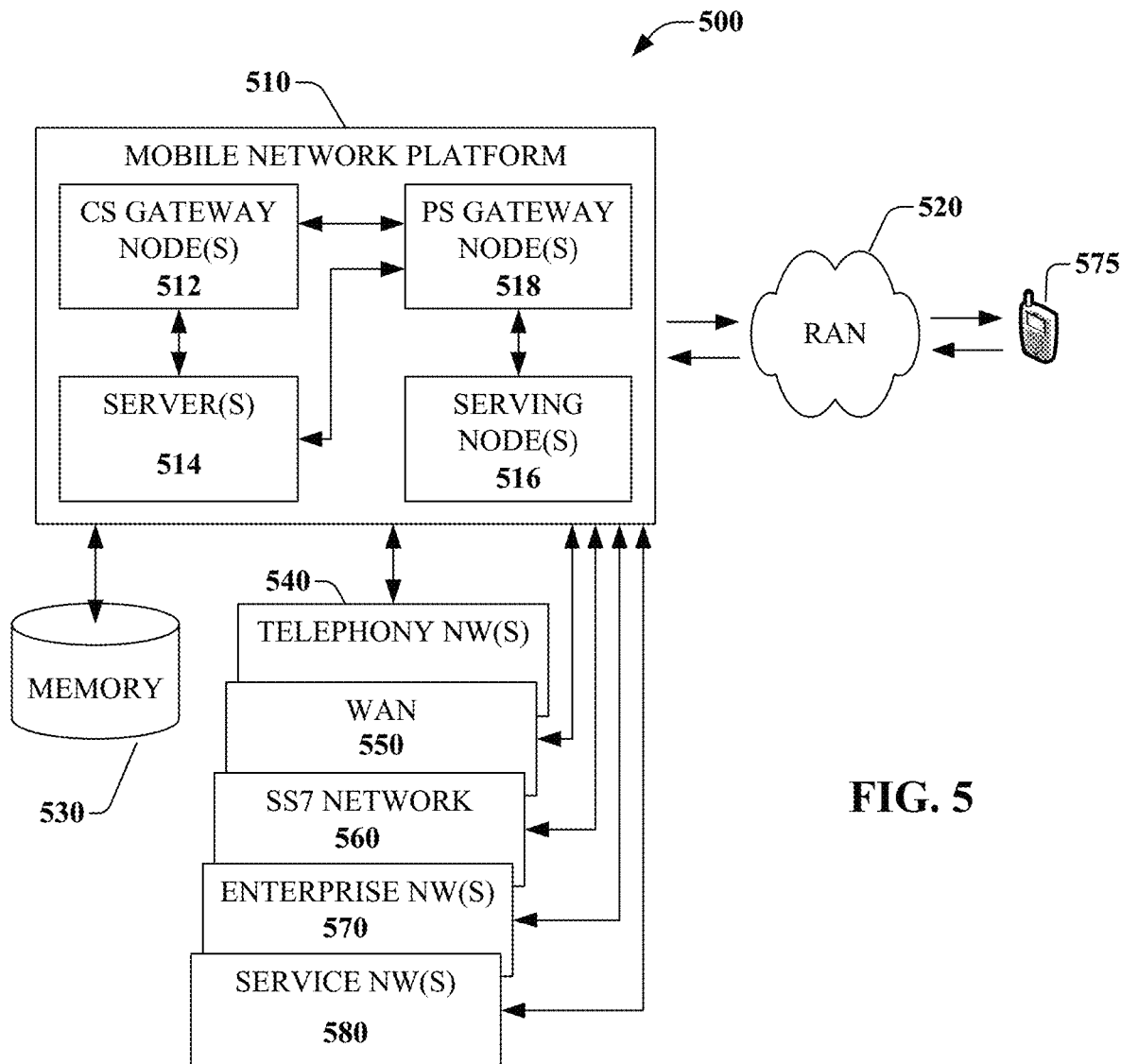
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part managing flow control in a wireless network between the network and a user equipment device by providing current and historical information to a machine learning model to split data packets for communication over multiple carriers to the user equipment device, and updating the machine learning model based on past flow control outcomes. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technologies utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
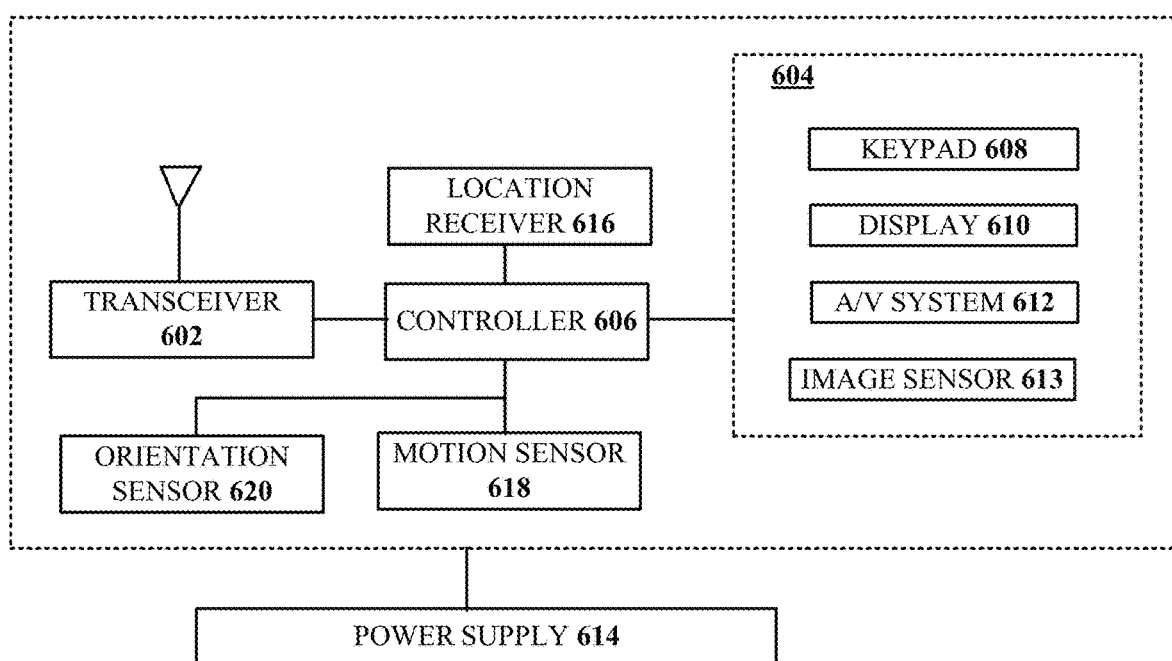
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part managing flow control in a wireless network between the network and a user equipment device by providing current and historical information to a machine learning model to split data packets for communication over multiple carriers to the user equipment device and updating the machine learning model based on past flow control outcomes.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence/machine learning (AI/ML) to facilitate automating one or more features described herein. The embodiments (e.g., in connection with automatically identifying acquired cell sites that provide a maximum value/benefit after addition to an existing communication network) can employ various AI/ML-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)=$confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
establishing communication between one or more cells of a wireless communication network and a user equipment (UE) device, wherein the establishing communication comprises communicating with the UE device over a plurality of carriers of the one or more cells of the wireless communication network, the plurality of carriers aggregated for a time for communication with the UE device;
receiving a data packet at the processing system, the data packet for communication to the UE device via the one or more cells of the wireless communication network;
receiving a set of packet-splitting rules, wherein the set of packet-splitting rules define conditions for splitting packets including the data packet into a number of smaller data packets for transmission to the UE device, each smaller data packet of the number of smaller data packets including less data for transmission to the UE than the data packet, each smaller data packet including payload data, wherein payload data of all smaller data packets of the number of smaller data packets together forms payload data of the data packet, and wherein the set of packet-splitting rules further define conditions for not splitting packets into the number of smaller data packets;

receiving network information about current network conditions in the wireless communication network, the network information including information about data traffic to user equipment devices including the UE device and information about radio conditions of the UE device;

providing, to a machine learning model, the set of packet-splitting rules and the information about current network conditions in the wireless communication network;

receiving, from the machine learning model, a flow control arrangement for the data packet, wherein the receiving the flow control arrangement comprises receiving information defining a number of smaller packets to split the data packet into and receiving information defining respective carriers of the plurality of carriers of the wireless communications network for communication of respective data packets of the number of smaller data packets; and communicating the number of smaller data packets to the UE device according to the flow control arrangement for reassembly of the number of smaller data packets into a reassembled data packet by the UE device.

2. The device of claim 1, wherein the operations further comprise:

receiving historical information about past network conditions;

receiving outcome information about past packet splitting operations in the wireless communications network;

providing, to the machine learning model, the historical information and the outcome information; and receiving, from the machine learning model, the flow control arrangement for the data packet based on the historical information and the outcome information.

3. The device of claim 2, wherein the operations further comprise:

modifying one or more packet-splitting rules of the set of packet-splitting rules, forming updated packet-splitting rules, wherein the modifying is based on the outcome information; and providing, to the machine learning model, the updated packet-splitting rules, wherein the updated packet-splitting rules define conditions for splitting packets subsequent data packets for transmission to the UE device.

4. The device of claim 3, wherein the receiving the set of packet-splitting rules comprises:

receiving a rule defining a maximum timing difference between carriers, the maximum timing difference defining a maximum permitted timing delay between communicating a first smaller data packet of the number of smaller data packets on a first carrier with the UE device and communicating a second smaller data packet of the number of smaller data packets on a second carrier with the UE device.

5. The device of claim 4, wherein the operations further comprise:

modifying the rule defining a maximum timing difference, wherein the modifying is based on the outcome information and wherein the modifying comprises decreasing the maximum time difference for transmission of subsequent data packets.

6. The device of claim 2, wherein the operations further comprise:

updating the machine learning model based on the outcome information.

7. The device of claim 1, wherein the communicating the number of smaller data packets to the UE device comprises communicating the number of smaller data packets within a time to avoid a re-assembly timer expired error, an out of window (OOW) error and a UE buffer overflow error, and to ensure that payload data of the reassembled data packet at the UE device matches payload data of the data packet at the processing system.

8. The device of claim 1, wherein the processing system forms a part of at least one of an application layer, a Packet Data Convergence Protocol (PDCP) layer or a Radio Link Control (RLC) layer of the wireless communication network.

9. A non-transitory machine-readable medium, comprising executable instructions that, when executed by a processing system including a processor, facilitate performance of operations, the operations comprising:

training a machine learning model with training data, the training data including information about a network arrangement of a wireless communication network, historical network conditions of the wireless communication network, historical flow control selections for communicating data from the wireless communication network to user equipment (UE) devices using multiple aggregated carriers of the wireless communication network, and outcomes of the historical flow control selections;

providing, to the machine learning model, a set of packet-splitting rules, wherein the set of packet-splitting rules define conditions for splitting data packets received at the processing system into smaller data packets for transmission to the UE device, and wherein the set of packet-splitting rules further define conditions against splitting data packets into the smaller data packets;

receiving a data packet for communication to a UE device, the UE device in data communication over two or more radio carriers with one or more cells of the wireless communication network;

providing, to the machine learning model, information about the data packet and the UE device and information about current network conditions for the wireless communication network;

receiving, from the machine learning model, a flow control arrangement, the flow control arrangement selected by the machine learning model for the data packet, wherein the receiving the flow control arrangement comprises receiving information defining a number of smaller packets to split the data packet into and receiving information defining respective carriers of the multiple aggregated carriers of the wireless communications network for communicating respective smaller data packets of the number of smaller data packets; and communicating smaller data packets of the number of smaller data packets to the UE device according to the flow control arrangement for reassembly of the number of smaller data packets into a reassembled data packet by the UE device, the flow control arrangement selected by the machine learning model according to the set of packet-splitting rules, the information about the data packet and the UE device, and the information about current network conditions to ensure the reassembled data packet at the UE device matches the data packet at the processing system.

10. The non-transitory machine-readable medium of claim 9, wherein the operations further comprise:
receiving a streaming data file for communication to the UE device over the wireless communication network, the streaming data file including a sequence of data packets including the data packet for communication to the UE device.

11. The non-transitory machine-readable medium of claim 10, wherein the operations further comprise:
minimizing, by the machine learning model, of splitting of data packets of the sequence of data packets to ensure reliable reassembly of the data packets of the sequence of data packets at the UE device.

12. The non-transitory machine-readable medium of claim 9, wherein the operations further comprise:
receiving outcome information about success of the flow control arrangement; and
modifying one or more of the packet-splitting rules according to the outcome information to adapt the machine learning model and to ensure future reassembled data packets at the UE device match an original data packet at the processing system.

13. The non-transitory machine-readable medium of claim 12, wherein the operations further comprise:
receiving updated network information about changed network conditions relative to the current network conditions for the wireless communication network; and
modifying one or more of the set of packet-splitting rules according to the outcome information and the updated network information to adapt the machine learning model and to ensure future reassembled data packets at the UE device match an original data packet at the processing system.

14. A method, comprising:
receiving, by a processing system including a processor, a data packet for transmission over a wireless network to a user equipment (UE) device in data communication with one or more network elements of the wireless network over one or more carrier legs of the wireless network;
receiving, by the processing system, information about current network conditions in the wireless network;
retrieving, by the processing system, a set of packet splitting rules, wherein respective rules of the set of packet splitting rules define initial boundary conditions for a process of splitting packets, including the data packet, into smaller data packets for transmission to the UE device, and wherein the set of packet-splitting rules further define conditions for a process of not splitting packets into smaller data packets;
applying, by the processing system, in a machine learning model, one or more packet splitting rules of the set of packet splitting rules to split the data packet into a set of smaller data packets, wherein the applying is based on the information about current network conditions in the wireless network;
selecting, by the processing system, in the machine learning model, a flow control arrangement for the data packet, wherein the selecting comprises determining a number of smaller packets to split the data packet, selecting respective carrier legs of the one or more carrier legs of the wireless network for communication of respective data packets of the number of smaller data packets; and
communicating, by the processing system, the number of smaller data packets to the UE device.

15. The method of claim 14, further comprising:
receiving, by the processing system, an outcome indication for the flow control arrangement;
modifying, by the processing system, one or more packet splitting rules of the set of packet splitting rules, forming updated packet splitting rules, wherein the modifying is based on the outcome indication; and
applying, by the processing system, in the machine learning model, the updated packet splitting rules to split subsequent data packets for transmission to the UE device.

16. The method of claim 14, wherein the retrieving a set of packet splitting rules comprises:
retrieving, by the processing system, a rule defining a maximum number smaller data packets into which the data packet may be split.

17. The method of claim 16, further comprising:
receiving, by the processing system, an outcome indication for the flow control arrangement; and
modifying, by the processing system, the rule defining the maximum number smaller data packets into which the data packet may be split, wherein the modifying is based on the outcome indication for the flow control arrangement and wherein the modifying comprises reducing the maximum number smaller data packets into which the data packet may be split.

18. The method of claim 14, further comprising:
applying, by the processing system, in the machine learning model, rules of the set of packet splitting rules at one of an application layer, a Packet Data Convergence Protocol (PDCP) layer or a Radio Link Control (RLC) layer of the wireless network.

19. The method of claim 14, further comprising:
training, by the processing system, the machine learning model initially using supervised learning; and
subsequently, training, by the processing system, the machine learning model using unsupervised learning.

20. The method of claim 14, further comprising:
packetizing, by the processing system, the set of smaller data packets, wherein the packetizing comprises, for each smaller data packet of the set of smaller data packets,
selecting a portion of payload bits of the data packet; and
combining the portion of payload bits of the data packet with control bits, the control bits identifying the UE device as a destination for each smaller data packet of the set of smaller data packets.

* * * * *